(12) United States Patent
Itomi (10) Patent No.: US 9,739,672 B2
(45) Date of Patent: Aug. 22, 2017

(54) TORQUE SENSOR UNIT

(71) Applicant: NTN CORPORATION, Osaka (JP)

(72) Inventor: Shoji Itomi, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/916,351

(22) PCT Filed: Sep. 3, 2014

(86) PCT No.: PCT/JP2014/073170
§ 371 (c)(1),
(2) Date: Mar. 3, 2016

(87) PCT Pub. No.: WO2015/037491
PCT Pub. Date: Mar. 19, 2015

(65) Prior Publication Data
US 2016/0216168 A1 Jul. 28, 2016

(30) Foreign Application Priority Data

Sep. 12, 2013 (JP) ................................. 2013-189367

(51) Int. Cl.
| | | |
|---|---|---|
| *G01L 3/00* | (2006.01) | |
| *G01L 3/10* | (2006.01) | |
| *F16C 41/00* | (2006.01) | |
| *B62D 6/10* | (2006.01) | |
| *B62D 15/02* | (2006.01) | |
| *G01L 5/22* | (2006.01) | |

(52) U.S. Cl.
CPC ................ *G01L 3/104* (2013.01); *B62D 6/10* (2013.01); *B62D 15/0215* (2013.01); *F16C 41/007* (2013.01); *G01L 5/221* (2013.01)

(58) Field of Classification Search
CPC ........... G01L 3/104; G01L 5/221; B62D 6/10; B62D 15/0215; F16C 41/007
USPC ...................................... 73/862.327, 862.333
See application file for complete search history.

(56) References Cited

U.S. PATENT DOCUMENTS

| | | |
|---|---|---|
| 4,918,997 A | 4/1990 | Pouillange |
| 5,255,567 A | 10/1993 | Miyake et al. |
| 8,519,700 B2 * | 8/2013 | Jerance .................. G01D 5/145 324/207.12 |

(Continued)

FOREIGN PATENT DOCUMENTS

| | | |
|---|---|---|
| DE | 100 60 287 | 6/2001 |
| DE | 10 2010 032 061 | 1/2012 |

(Continued)

OTHER PUBLICATIONS

Extended European Search Report issued Aug. 22, 2016 in corresponding European Patent Application No. 14844446.6.
International Search Report issued Sep. 30, 2014 in corresponding International Application No. PCT/JP2014/073170 (with English translation).

(Continued)

*Primary Examiner* — Max Noori
(74) *Attorney, Agent, or Firm* — Wenderoth, Lind & Ponack, L.L.P.

(57) ABSTRACT

A torque sensor unit includes two magnetic angle sensors capable of detecting absolute rotation angles of a shaft member which indicate a twist angle of the shaft member when the shaft member is twisted. The shaft member has two end portions exposed to outside so that the shaft member can be connected at the two end portions to shaft-forming parts of a device.

20 Claims, 5 Drawing Sheets

(56) References Cited

U.S. PATENT DOCUMENTS

| | | | |
|---|---|---|---|
| 9,004,770 B2* | 4/2015 | Klinglmair | F16C 41/007 |
| | | | 384/448 |
| 9,228,590 B2* | 1/2016 | Nachtergaele | F04C 18/16 |
| 9,353,797 B2* | 5/2016 | Drescher | F16C 41/007 |
| 2005/0257625 A1* | 11/2005 | Roessner | G01D 5/2452 |
| | | | 73/862.327 |
| 2010/0064822 A1 | 3/2010 | Debrailly et al. | |
| 2011/0061983 A1* | 3/2011 | Sato | F16D 27/10 |
| | | | 192/38 |
| 2011/0175600 A1 | 7/2011 | Jerance et al. | |
| 2012/0063918 A1* | 3/2012 | de Larminat | F16C 19/52 |
| | | | 417/1 |
| 2013/0179117 A1* | 7/2013 | Delbaere | G01D 5/145 |
| | | | 702/150 |

FOREIGN PATENT DOCUMENTS

| | | |
|---|---|---|
| EP | 1 353 151 | 10/2003 |
| JP | 4-62444 | 2/1992 |
| JP | 2006-282172 | 10/2006 |
| JP | 2010-509604 | 3/2010 |
| JP | 5059772 | 8/2012 |

OTHER PUBLICATIONS

Written Opinion of the International Searching Authority in corresponding International Application No. PCT/JP2014/073170.
"Development of 'High Precision Magnetic Angle Sensor' Enabling Advanced Control of Motors," New Technology, Apr. 28, 2010, http://ntn.co.jp/japan/news/news_files/new_products/news201000022.html.

* cited by examiner

TORQUE SENSOR UNIT

TECHNICAL FIELD

The present invention relates to a torque sensor unit used to measure torque applied to a shaft.

BACKGROUND ART

Known contact type torque sensors are used e.g., for vehicle steering devices (as disclosed in the below-identified Patent document 1). A non-contact type torque sensor is known which include two magnetic angle sensors arranged coaxial with a shaft and capable of detecting absolute rotation angles. These angle sensors convert the absolute rotation angles, which correspond to the rotational displacement at the respective axial positions, to output signals. When the shaft is twisted under torque applied to the shaft, the shaft is rotationally displaced about its axis to different degrees at two axially separate points. Thus, by detecting the rotational displacements at the two axially separate points as absolute rotation angles, the twist angle between these two axially separate points is given as the difference in output between such absolute rotation angles. Since there is a correlation based on the structural specifications of the shaft between the torque applied to the shaft and the twist angle of the shaft, it is possible to indirectly measure the torque applied to the shaft based on the difference in output between the absolute rotation angles and the above known correlation. This type of torque sensor units are therefore detectors configured to convert the torque applied to the shaft to absolute rotation angles at the above-mentioned two axially separate points.

There is known a magnetic angle sensor including at least one magnetic sensor element and at least one magnet which is arranged concentric with a shaft member so as to be rotationally displaced corresponding to the twist angle of the shaft member. As the magnet is rotationally displaced, the magnetic field generated by the magnet rotates relative to the magnetic sensor element, and the magnetic sensor element converts the change in magnetic flux density due to the rotation of the magnetic field to an electrical signal. Based on the electrical signal, the magnetic angle sensor generates an output signal corresponding to the absolute rotation angle.

Such magnetic angle sensors include a Vernier type sensor, which include a primary scale magnet including a plurality of pairs circumferentially arranged magnetic poles, and a Vernier magnet arranged so as to be concentric with the primary scale magnet and including a plurality of pairs of magnetic poles, wherein the total number of pairs of magnetic poles of the primary scale magnet is different than the total number of pairs of magnetic poles of the Vernier magnet, a first magnetic sensor element for detecting the density of the magnetic flux generated by the primary scale magnet, and a second magnetic sensor element for detecting the density of the magnetic flux generated by the Vernier magnet (see the below-identified Patent document 2 and Non-patent document 1).

There is also known a torque sensor unit including first and second magnetic angle sensors each including a cylindrical magnet magnetized in its diametrical direction, a first magnetic sensor element for detecting the tangential component of the magnetic field generated by the cylindrical magnet, and a second magnetic sensor element for detecting the radial component of the magnetic field (see the below-identified Patent document 3).

PRIOR ART DOCUMENTS

Patent Documents

Patent document 1: JP Patent Publication 2006-282172A
Patent document 2: European Patent Application Publication EP1353151A1
Patent document 3: JP Patent 5059772B

Non-Patent Document

Non-patent document 1: NTN Corporation, "News", "Information on new technology", "We have developed "a high-precision magnetic angle sensor" which enables sophisticated motor control", [online], Apr. 14, 2010, NTN Corporation, [Searched Aug. 21, 2013], Internet <URL: http//www.ntn.co.jp/japan/news/news_files/new_products/news201000022.h tml>

SUMMARY OF THE INVENTION

Object of the Invention

Since a magnetic angle sensor calculates the angle based on the magnetic flux density as detected by the magnetic sensor element, mounting errors of the magnet and the magnetic sensor element significantly influence the detection accuracy of the absolute rotation angle. It is therefore required to mount the magnet and the magnetic sensor element with high accuracy. Also, in order to detect the above-described difference in output, which corresponds to the torque applied, with high accuracy, the two magnetic angle sensors have to be mounted with accurate mutual positional relationship (concentricity and the axial distance therebetween).

When the torque sensor unit disclosed in Patent document 1 is to be mounted to a device, it is necessary to mount, in addition to bearings for supporting the shaft of the device, a magnet and a magnetic sensor element to the shaft and a stationary member of the device, respectively.

An object of the present invention is to provide a torque sensor unit which can be easily mounted to a device.

Means for Achieving the Object

In order to achieve the above object, the present invention provides a torque sensor unit comprising a first rolling bearing including a first inner race and a first outer race, a second rolling bearing including a second inner race and a second outer race, a shaft member having an outer peripheral portion to which the first inner race and the second inner race are fixed such that the first inner race and the second inner race rotates together with the shaft member, and two end portions exposed to outside in an axial direction, a bearing restricting means restricting axial positions of the first rolling bearing and the second rolling bearing, a first magnetic angle sensor fixed to the first rolling bearing and configured to convert an absolute rotation angle of the first inner race when the shaft member is twisted to a first output signal, and a second magnetic angle sensor fixed to the second rolling bearing and configured to convert an absolute rotation angle of the second inner race when the shaft member is twisted to a second output signal. As used herein, the "axial direction" refers to the direction of the rotation axis of the shaft member, which is supported by the housing.

Advantages of the Invention

If a bearing to which each of the magnetic angle sensors is to be mounted has an inner race and an outer race, it is possible to mount the magnet of the magnetic angle sensor to the inner race so as to rotate together with the inner race, and to mount the magnetic sensor element to the outer race such that its position relative to the outer race remains unchanged. By fixing each magnetic angle sensor to the rolling bearing in this manner, the excellent positioning ability of the rolling bearing itself ensures high mounting accuracy of the magnet and the magnetic sensor element. By supporting the shaft member on the housing through the two rolling bearings, it is possible to fix the two magnetic angle sensors necessary to obtain the difference in output corresponding to the twist angle of the shaft member to the respective rolling bearings. By fixing the inner races of the bearings to the outer peripheral portion of the shaft member, and fitting the outer races of the bearings to the inner peripheral portion of the housing, concentricity of the two rolling bearings is ensured, which in turn ensures, in advance, concentricity of the two magnetic angle sensors fixed to the respective bearings. Since the axial positions of the rolling bearings are restricted by the bearing restricting means, the axial distance between the magnetic angle sensors can be accurately determined in advance. When the shaft member is twisted under torque applied thereto, the inner races, which are fixed to the outer peripheral portion, are rotated corresponding to the degrees of twisting at the respective portions. This causes the corresponding magnets to rotate together with the inner races. The magnetic angle sensors respectively convert the absolute rotation angles of the magnets to output signals. The torque sensor unit is therefore capable of detecting the absolute rotation angles at two locations of the shaft member which indicate the torque-dependent twist angle of the shaft member. In this torque sensor unit, the rolling bearings, the shaft member, the housing, and the bearing restricting means cooperate to ensure accurate mounting of the magnets and the magnetic sensor elements, of the magnetic angle sensors so as to ensure, in advance, accurate positional relationship between the two magnetic angle sensors, and also to allow the torque sensor unit to be handled as an integral unit. Since the shaft member of this torque sensor unit has its both end portions exposed to the outside in the opposite axial directions, the shaft member can be connected at the end portions to the shaft-forming parts of a device so that the shaft member can be used as portions of the shafts of the device. With this arrangement, since it is not necessary to mount, with high accuracy, a magnet and a magnetic sensor element to the shaft and a stationary member, of the device, in addition to a bearing for supporting the shaft, this torque sensor unit can be easily mounted to the device.

MODE FOR EMBODYING THE INVENTION

In a first preferred embodiment of the present invention, the first magnetic angle sensor is located on the side of the first rolling bearing facing the second rolling bearing, and the second magnetic angle sensor is located on the side of the second rolling bearing facing the first rolling bearing. With this arrangement, since the two magnetic angle sensors are arranged in the housing utilizing the span between the rolling bearings, which are necessary to support the shaft member, it is possible to reduce the axial length of the torque sensor unit, compared to a torque sensor unit in which the two magnetic angle sensors are provided on the sides of the respective rolling bearings close to the ends of the shaft member, provided the bearing spans are the same.

In a second preferred embodiment, the bearing restricting means is configured to generate a preload for eliminating gaps in the first rolling bearing and the second rolling bearing. By eliminating gaps in both rolling bearings, the distance between the magnetic sensor element and the magnet is kept constant, which improves angle detection accuracy. Whether or not to use the arrangement of the second embodiment can be determined independently of whether or not to use the arrangement of the first embodiment.

Magnetic angle sensors usable in the present invention may be any detectors capable of a converting a change in the magnetic flux density due to rotation of the respective magnets when the shaft member is twisted to an electrical signal, and converting the electrical signal to an output signal corresponding to an absolute rotation angle.

By way of example, each of the first magnetic angle sensor and the second magnetic angle sensor may include a primary scale magnet including a plurality of pairs of circumferentially arranged magnetic poles, a Vernier magnet arranged so as to be concentric with the primary scale magnet and including a plurality of pairs of magnetic poles, wherein the total number of pairs of magnetic poles of the primary scale magnet is different than the total number of pairs of magnetic poles of the Vernier magnet, a first magnetic sensor element for detecting a density of a magnetic flux generated by the primary scale magnet, and a second magnetic sensor element for detecting a density of a magnetic flux generated by the Vernier magnet.

Alternatively, each of the first magnetic angle sensor and the second magnetic angle sensor may include a cylindrical magnet magnetized in a diametrical direction of the cylindrical magnet, a first magnetic sensor element for detecting a tangential component of a magnetic field generated by the cylindrical magnet, and a second magnetic sensor element for detecting a radial component of said magnetic field.

EXAMPLES

Figure 1:
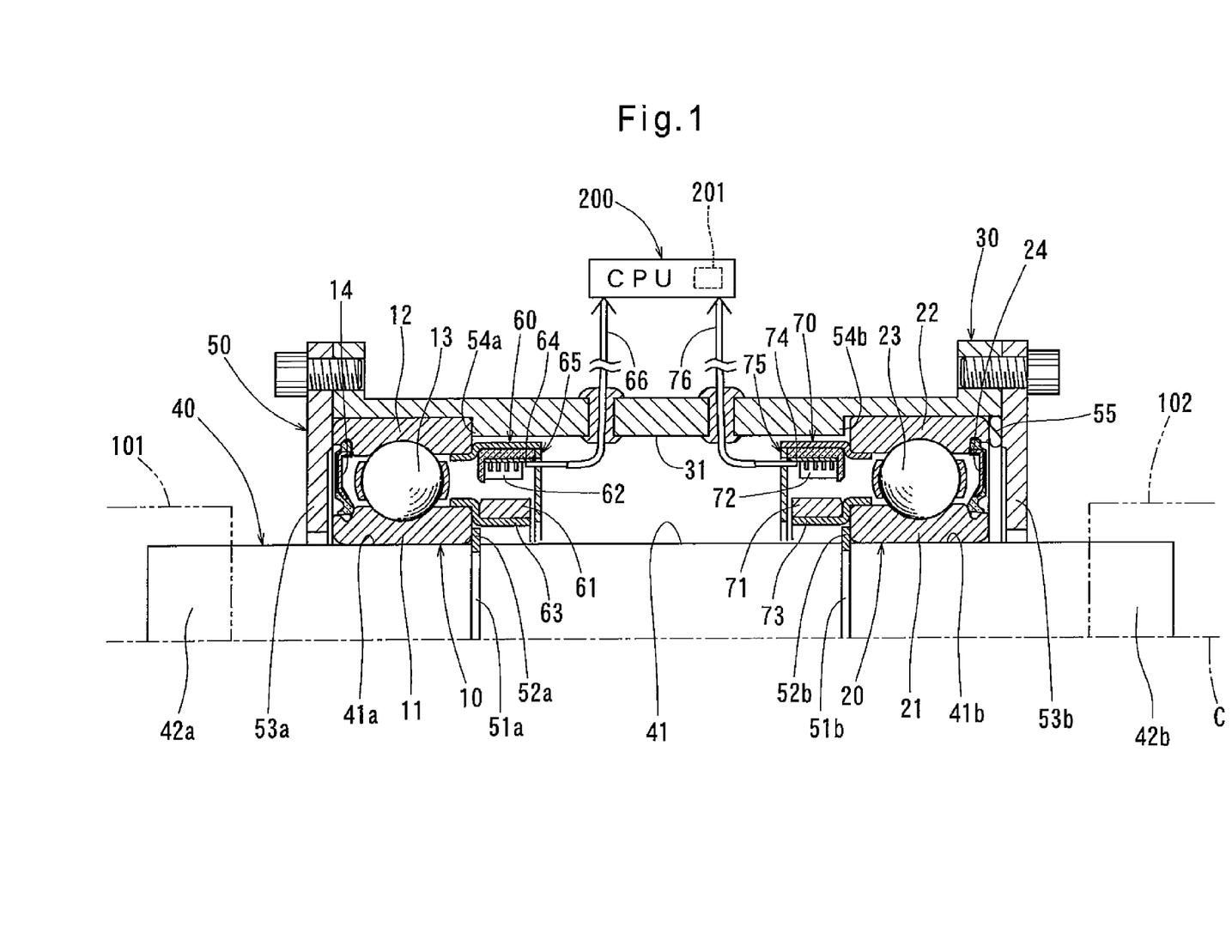
FIG. 1 is a partially sectional view of a torque sensor unit according to a first specific example of the present invention.

Now a torque sensor unit as a first specific example is described with reference to FIG. 1. As shown, this torque sensor unit includes a first rolling bearing 10, a second rolling bearing 20, a housing 30, a shaft member 40, a bearing restricting means 50, a first magnetic angle sensor 60, and a second magnetic angle sensor 70. The magnetic angle sensor 60 is fixed to the rolling bearing 10, while the magnetic angle sensor 70 is fixed to the rolling bearing 20.

The first rolling bearing 10 includes a first inner race 11, a first outer race 12, and a plurality of rolling elements 13 disposed between the inner race 11 and the outer race 12. The second rolling bearing 20 includes a second inner race 21, a second outer race 22, and a plurality of rolling elements 23 disposed between the inner race 21 and the outer race 22. The rolling bearings 10 and 20 themselves have the ability of position the inner and outer races 11 and 12, and the inner and outer races 21 and 22, respectively. In particular, the maximum permissible displacement of the outer race 12 relative to the inner race 11 is determined by axial and radial internal gaps defined in the rolling bearing 10. Similarly, the maximum permissible displacement of the outer race 22 relative to the inner race 21 is determined by axial and radial internal gaps defined in the rolling bearing 20. The rolling bearings 10 and 20 of this torque sensor unit are ball bearings identical in specifications to each other, and are both of the inseparable type.

The housing 30 has an inner peripheral portion 21 in which the first outer race 12 and the second outer race 22 are fitted.

The shaft member 40 has an outer peripheral portion 41 which is opposed to the inner peripheral portion of the housing 30. The first and second rolling bearings 10 and 20 are disposed between the inner peripheral portion 31 of the housing 30 and the outer peripheral portion 41 of the shaft member 40, with the first and second inner races 11 and 21 fixed to the outer peripheral portion 41 so as to be rotated together with the shaft member 4, whereby the shaft member 40 is supported by the housing 30 through the bearings 10 and 20. The respective bearings 10 and 20 have center axes which coincide with each other and with the center axes of the outer peripheral portion 41, and the inner peripheral portion 31.

Due to an interference fit between the fitting surface of the inner race 11 and a fitting surface 41a of the outer peripheral portion 41, the inner race 11 is rotated together with the fitting surface 41a of the outer peripheral portion 41 when the shaft member 40 is twisted. Similarly, due to an interference fit between the fitting surface of the inner race 21 and a fitting surface 41b of the outer peripheral portion 41, the inner race 21 is rotated together with the fitting surface 41b of the outer peripheral portion 41 when the shaft member 40 is twisted.

The shaft member 40 has end portions 42a and 42b at both ends of the outer peripheral portion 41. Of the end portions 42a and 42b, the end portion 42a is exposed to the outside toward one of the opposite axial directions, while the end portion 42b is exposed to the outside toward the other axial direction. The exposed end portions 42a and 42b are used to connect the shaft member 40 to shaft-forming parts of 101 and 102 of a device. Once connected, the shaft member 40 constitutes portions of the shafts of the device so as to be coaxial with the shaft-forming parts 101 and 102, so that under torque applied to the shaft member 40 through the shaft-forming parts 101 and 102, the shaft member 40 is twisted corresponding to the torque applied. If this torque sensor unit is used in the steering device disclosed in Patent document 1, the shaft member 40 corresponds to "the torsion bar"; the shaft-forming part 101, to "the steering shaft", and the shaft-forming part 102, to "the pinion shaft".

The bearing restricting means 50 restricts the axial positions of the respective rolling bearings 10 and 20. In particular, the axial positions of the bearings 10 and 20 are restricted by ring grooves 51a and 51b formed in the shaft member 40, snap rings 52a and 52b fitted in the respective ring grooves 51a and 51b, lids 53a and 53b fixed to the housing 30 by tightening bolts, shoulders 54a and 54b formed on the housing 30, and a preload source 55 disposed between one of the lids 53a and 53b and the corresponding outer race 12, 22.

The bearing restricting means 50 eliminates any gaps in the respective rolling bearings 10 and 20 by applying a preload to the respective bearings 10 and 20. The preload source 55 comprises an elastically compressible member or members disposed in a compressed state between one of the lids 53a and 53b and the corresponding outer race 12 and 22. The repulsive force of the preload source 55 is applied, as an axial pushing force, to the outer races 12 and 22 of the rolling bearings 10 and 20, of which the axial movement is restricted by the other parts of the bearing restricting means 50, thereby applying a fixed-position preload which eliminates any gaps in the rolling bearings 10 and 20. The elastically compressible member or member may be one or more than one wave washer, or one or more than one coil spring.

Each magnetic angle sensor 60, 70 includes at least one magnet 61. 71 configured to rotate as the shaft member 40 is twisted, and at least one magnetic sensor element 62, 72 configured to covert a change in magnetic flux density due to the rotation of the magnet 61, 71 to an electrical signal, and is configured to convert the electrical signal to a first or second output signal indicative of the absolute rotation angle of the corresponding inner race 11, 21. The magnetic angle sensors 60 and 70 of the torque sensor of the first specific example are absolute encodes identical in specifications to each other. The magnets 61 and 71 are respectively fixed to ring-shaped magnet holders 63 and 73 having center axes coincident with the center axes C of the bearings. Since the magnet holders 63 and 73 are forcibly fitted to the inner races 11 and 21, the magnets 61 and 71 are rotationally and axially fixed to the respective inner races 11 and 21. The sensor elements 62 and 72 are respectively fixed to circuit boards 64 and 74, which are in turn respectively fixed to ring-shaped sensor covers 65 and 75 having center axes coincident with the center axes C of the bearings. Each sensor cover 65 and 75 includes a ring-shaped magnetic shield member of which the center axis coincides with the center axes C of the bearings, and an insulating base which is fixed to the shield member inside the shield member, and to which the corresponding circuit board 64, 74 is fixed. Since the sensor covers 65 and 75 are forcibly fitted to the respective outer races 12 and 22, the magnetic sensor elements 62 and 72 are mounted to the respective outer races 12 and 22 such that their positions relative to the corresponding magnets 61 and 71 remain unchanged. By mounting, in the above-described manner, the magnets 61 and 71 to the inner races 11 and 21, and the magnetic sensor elements 62 and 72 to the outer races 12 and 22, the magnetic angle sensor 60 and 70 to the respective rolling bearings 10 and 20.

The rolling bearings 10 and 20 each include only one seal 14, 24, and the magnetic angle sensors 60 and 70 are mounted to the ends of the respective bearings opposite from the ends where there are the seals 14 and 24. Labyrinth seals are defined between the sensor covers 65 and 75 and the corresponding magnet holders 63 and 73.

The magnetic angle sensor 60 is provided on the side of the rolling bearing 10 opposite to the rolling bearing 20. The magnetic angle sensor 70 is provided on the side of the rolling bearing 20 opposed to the rolling bearing 10. Thus, as shown, since the magnetic angle sensors 60 and 70 are arranged in the housing 30 utilizing the span between the rolling bearings 10 and 20, which are necessary to support the shaft member 40, it is possible to reduce the axial length of the torque sensor unit. The positions of the seals 14 and 24 and those of the magnetic angle sensors 60 and 70 may be reversed, though this will only result in an increased axial distance between the magnetic angle sensors 60 and 70, and thus an increased axial width of the housing 30.

Since the rolling bearings 10 and 20 themselves are capable of positioning the inner and outer races 11 and 21 and the inner and outer races 12 and 22 with high accuracy based on gaps in the bearings, the magnets 61 and 71 and the magnetic sensor elements 62 and 72 can be mounted in position in advance with high accuracy. Since the inner races 11 and 21 are fixed to the outer peripheral portion 41 of the shaft member 40, and the outer races 12 and 22 are fitted to the inner peripheral portion 31 of the housing 30, the concentricity between the rolling bearings 10 and 20 is high, and the concentricity of the magnetic angle sensors 60 and 70, which are fixed to the bearings 10 and 20, is also high in advance. Since the axial positions of the rolling bearings 10 and 20 are restricted by the bearing restricting means 50, the axial distance between the magnetic angle sensors 60 and 70 can be accurately determined in advance. When the shaft member 40 is twisted under torque applied thereto, the inner races 11 and 21, which are fixed to the outer peripheral portion 41, are rotated corresponding to the degrees of twisting at the respective fitting surfaces 41a and 41b. This causes the corresponding magnets 61 and 71 to rotate together with the inner races 11 and 21. The magnetic angle sensors 60 and 70 respectively convert the absolute rotation angles of the magnets 61 and 71 to the first and second output signals. The torque sensor unit of the first specific example is therefore capable of detecting the absolute rotation angles at two locations of the shaft member which indicate the torque-dependent twist angle of the shaft member 40. In this torque sensor unit, the rolling bearings 10 and 20, the shaft member 40, the housing 30, and the bearing restricting means 50 cooperate to ensure accurate mounting of the magnets 61 and 71 and the magnetic sensor elements 62 and 72, of the magnetic angle sensors 60 and 70 so as to ensure, in advance, accurate positional relationship between the two magnetic angle sensors 60 and 70, and also to allow the torque sensor unit to be handled as an integral unit. Since the shaft member 40 of this torque sensor unit has its both end portions 42a and 42b exposed to the outside in the opposite axial directions, the shaft member 40 can be connected at the end portions 42a and 42b to the shaft-forming parts 101 and 102 of a device so that the shaft member 40 can be used as portions of the shafts of the device. With this arrangement, since it is not necessary to mount, with high accuracy, a magnet and a magnetic sensor element to the shaft and a stationary member, of the device, in addition to a bearing for supporting the shaft, this torque sensor unit can be easily mounted to the device.

The circuit boards 64 and 74 are connected to a computing/processing unit (central processing unit; CPU) 200 through respective cables 66 and 76. Signals are transmitted to and from the magnetic angle sensors 60 and 70 through the cables 66 and 76. The computing/processing unit 200 calculates the difference in output between the magnetic angle sensors 60 and 70 based on the first and second output signals. The computing/processing unit 200 include a memory table 201 in which based on the difference in output between the magnetic angle sensors 60 and 70 while no torque is being applied to the shaft member 40, the value of torque applied to the shaft member 40 is linked to the difference in output between the magnetic angle sensors 60 and 70. The correlation between the magnitude of the torque and the difference in output between the magnetic angle sensors 60 and 70 can be identified by testing in advance. The computing/processing unit 200 is capable of calculating the torque value based on the pre-calculated difference in output between the magnetic angle sensors 60 and 70, while referring to the table 200, because the torque value is linked to the output difference. If, for example, the computing/processing unit 200 is control processing unit of another device, such as an ECU of a vehicle, the computing/processing unit 200 will be capable of controlling the motor for a steering device based on the torque value calculated in the above-described manner. If the computing/processing unit 200 is a signal processing unit of a torque meter, it will be capable of performing output control for displaying the calculated torque value.

The bearing restricting means 50 may be a known bearing mounting structure, provided such a bearing mounting structure is capable of restricting the axial positions of the rolling bearings 10 and 20 such that the axial distance between the two magnetic angle sensors 60 and 70 is within such a range that the twist angle of the shaft member 40 is detectable without a problems. Provided the torque sensor unit can be handled as an integral unit by supporting the shaft member 40 on the housing 30 in the radial direction and in the opposite axial directions (right and left directions in FIG. 1), the bearing restricting means 50 and the rolling bearings 10 and 20 are not limited in specifications, and the bearings 10 and 20 need not be identical in specifications to each other. An additional bearing or bearings may also be provided to better support the shaft member 40.

In this torque sensor unit, since the distance between the magnetic sensor elements 62 and 72 and the distance between the magnets 61 and 71 are kept constant by the preload applied by the bearing restricting means 50 for eliminating any gaps in the rolling bearings 10 and 20, accuracy of angle detection improves.

If the bearing restricting means 50 has a preloading function, the structure for applying a preload is not limited, provided it can eliminate any gaps in the bearings. Within the permissible use range of the torque sensor unit, gaps in the bearings are preferably kept at zero or negative value even when the shaft member 40 and/or the housing 30 is expanded or shrunk with e.g., a change in temperature. However, if the magnetic angle sensors 60 and 70 can perform their detection function without difficulty, a bearing restricting means with no preloading function may be used.

Figure 2:
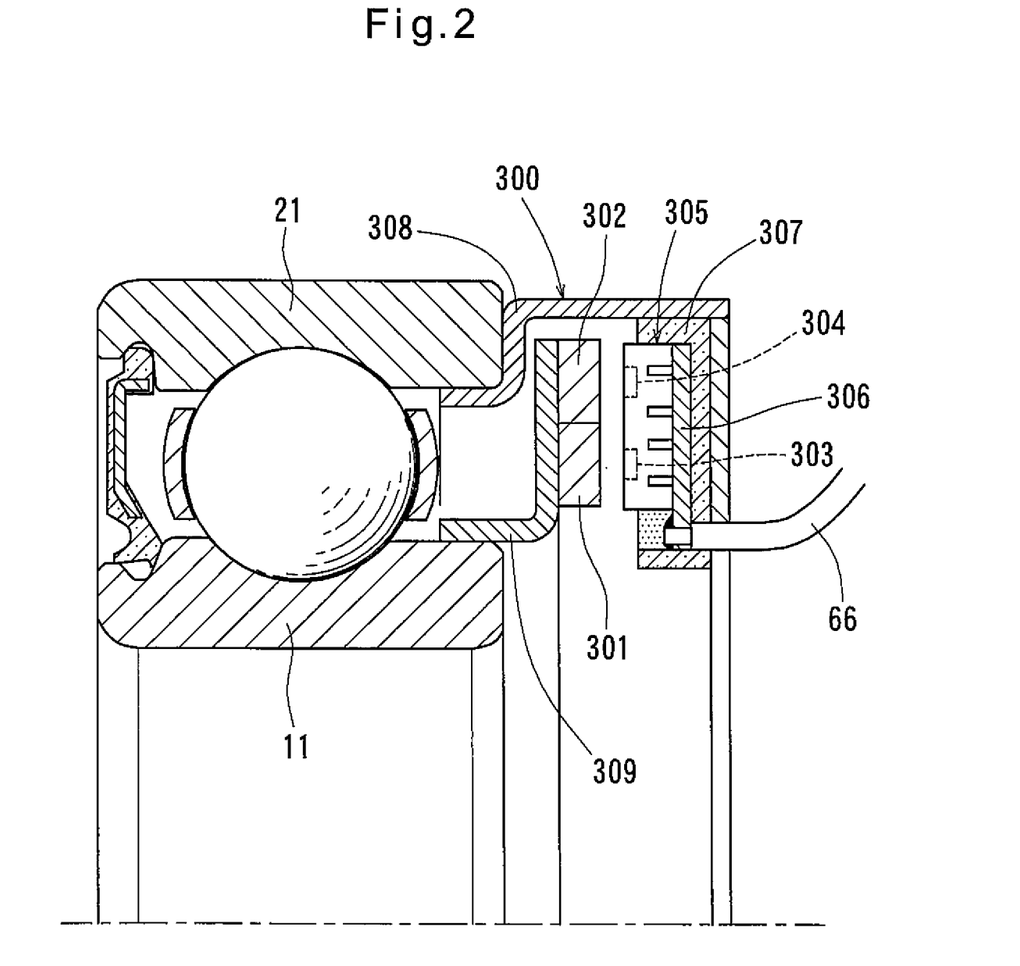
FIG. 2 is a partially sectional view of a torque sensor unit according to a second specific example of the present invention.
Figure 3:
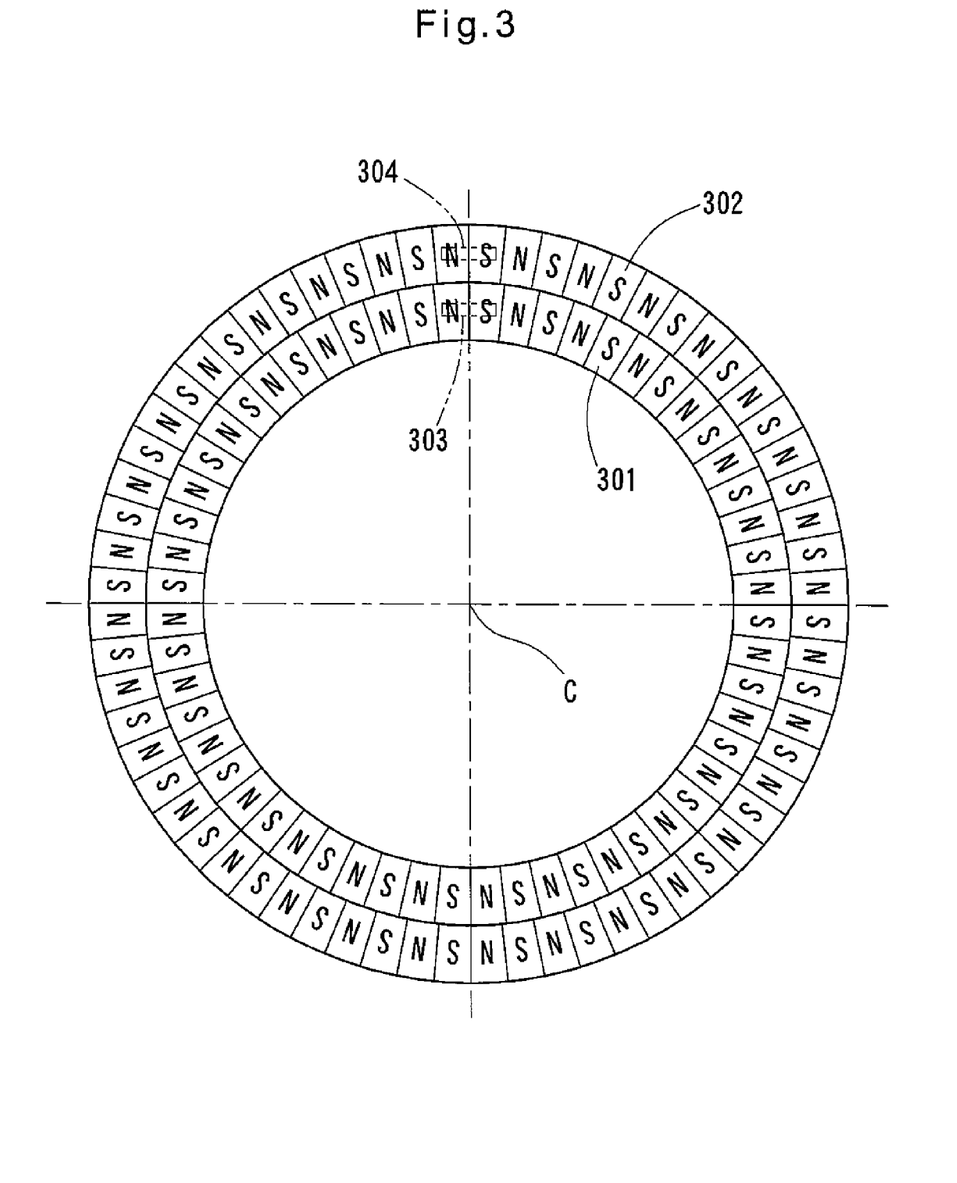
FIG. 3 is a front view of a primary scale magnet and a Vernier magnet of the second specific example, showing how their magnetic poles are arranged.

A second specific example is shown in FIGS. 2 and 3. This example differs from the first specific example in that a magnetic angle sensor 300 shown in FIGS. 2 and 3 is used instead of each of the magnetic angle sensors used in the first specific example. Only this difference is described now. FIGS. 2 and 3 show only one of the two magnetic angle sensors 300 of the second specific example. The sensor 300 shown includes a primary scale magnet 301, a Vernier magnet 302, a first magnetic sensor element 303, and a second magnetic sensor element 304. The primary scale magnet 301 includes a plurality of circumferentially alternating pairs of magnetic poles, namely, N-poles and S-poles, and the Vernier magnet 302 is arranged so as to be concentric with the primary scale magnet 301, and include a plurality of circumferentially alternating pairs of magnetic poles, namely, N-poles and S-poles, in which the total number of pairs of magnetic poles of the primary scale magnet 301 is different than the total number of pairs of magnetic poles of the Vernier magnet 302. If the number of pairs of magnetic poles of the primary scale magnet 301 is N and the number of the pairs of magnetic poles of the Vernier magnet 302 is N−1 or N+1, Vernier's principle is realized. The magnetic sensor element 303 detects the magnetic flux density of the primary scale magnet 301. The magnetic sensor element 304 detects the magnetic flux density of the Vernier magnet 302. The magnetic sensor elements 303 and 304 are component parts of an array device 305. The array device 305 is placed into a resin case 307 together with a circuit board 306, and then is resin-molded. The resin case 307 is fixed to the outer race 12 through a metal case 308. The primary scale magnet 301 and a Vernier magnet 302 are formed into a single annular member fixed to a metal core 309 which is in turn fixed to the radially outer surface of the inner race 11. The magnetic sensor elements 303 and 304 are arranged so as to face the primary scale magnet 301 and the Vernier magnet 302, respectively.

When the primary scale magnet 301 rotates together with the inner race 11, the magnetic field of the primary scale magnet 301 is received by the magnetic sensor element 303 as a first magnetic signal indicative of the magnetic flux density and changing in the form of a sine curve with the change in angular position of the inner race 11. At this time, the magnetic field of the Vernier magnet 302, which is also rotating together with the inner race 11, is received by the magnetic sensor element 304 as a second magnetic signal indicative of the magnetic flux density and changing in the form of a sine curve which is shorter in frequency than the first magnetic signal, with the change in angular position of the inner race 11. The magnetic sensor element 303 converts the first magnetic signal to an electrical sensor signal. The magnetic sensor element 304 converts the second magnetic signal to an electrical sensor signal. The amount of deviation between these electrical sensor signals changes with the rotational position of the inner race 11. Thus, it is possible to calculate the rotational position (angle) of the inner race with high accuracy based on the amount of deviation between the sensor signals, utilizing Vernier's principle as disclosed in Patent document 2. In particular, the magnetic angle sensor 300 is of the Vernier type, of which the magnetic sensor elements 303 and 304 respectively detect the first and second magnetic signals, and which calculates the absolute rotation angle based on the difference in phase between the first and second magnetic signals and generates the thus calculated absolute rotation angle.

In FIGS. 2 and 3, the magnetized surfaces of the primary scale magnet 301 and the Vernier magnet 302 are both axial surfaces, but instead, the primary scale magnet 301 and the Vernier magnet 302 may be both annular members having radially outer surfaces formed with pairs of magnetic poles arranged in two rows. In this case, the magnetic sensor elements 303 and 304 are arranged to radially face the magnetized surfaces of the respective magnets 301 and 302.

Figure 4:
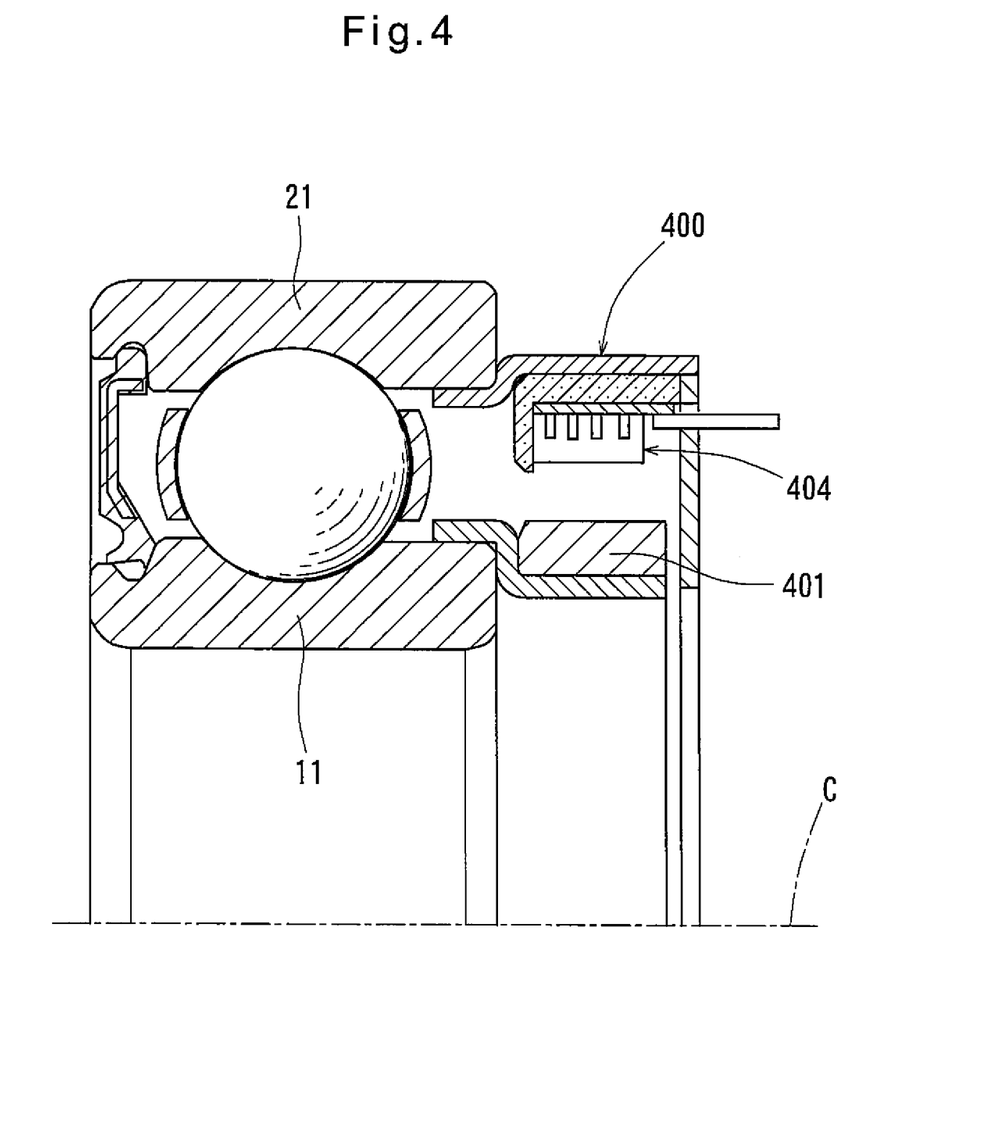
FIG. 4 is a partially sectional view of a torque sensor unit according to a third specific example of the present invention.
Figure 5:
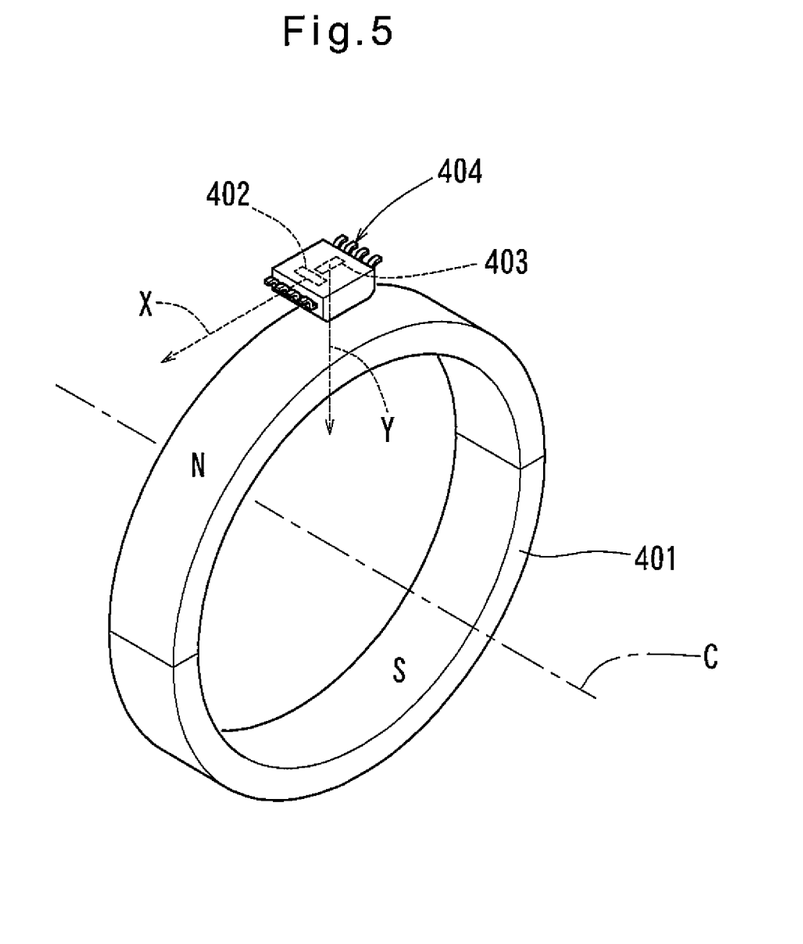
FIG. 5 is a perspective view of a cylindrical magnet and two magnetic sensor elements of the third specific example, showing their positional relationship.

A third specific example is shown in FIGS. 4 and 5. This example differs from the first and second specific examples in that a magnetic angle sensor 400 shown in FIGS. 4 and 5 is used instead of each of the magnetic angle sensors used in the first specific example. Only this difference is described now. FIGS. 4 and 5 show only one of the two magnetic angle sensors 400 of the third specific example. The sensor 400 shown includes a cylindrical magnet 401 magnetized in the diametrical direction, a first magnetic sensor element 401 for detecting the tangential component (component in the direction of the arrow X in FIG. 5) of the magnetic field generated by the cylindrical magnet 401, and a second magnetic sensor element 402 for detecting the radial component (component in the direction of the arrow Y in FIG. 5) of the magnetic field generated by the magnet 401.

The magnetic sensor elements 402 and 403 are component parts of an array device 404. The cylindrical magnet 401 is formed by magnetizing a cylindrical magnetic material to create a diametrically opposed pair of N- and S-poles. The magnetic sensor elements 402 and 403 are opposed to the radially outer surface of the cylindrical magnet 401 at substantially the same position as each other.

When the cylindrical magnet 401 rotates together with the inner race 11, the magnetic sensor element 402 converts a change in the tangential component of the magnetic field generated by the cylindrical magnet 401 to an electrical sensor signal, while the magnetic sensor element 403 converts a change in the radial component of the magnetic field generated by the cylindrical magnet 401 to an electrical sensor signal. The sensor signal of the magnetic sensor element 402 and the sensor signal of the magnetic sensor element 403 are in the form of sine waves that are displaced in phase by 90 degrees from each other. The array device 404 is configured to calculate the tangent from these two sensor signals, calculates its inverse function, and generates the rotation angular position. As such a magnetic angle sensor 400, the magnetic angle sensor disclosed in Patent document 3 may be used.

The present invention is not limited to the above-described embodiments, but includes all modifications that are within the scope of the claims.

DESCRIPTION OF THE NUMERALS 10, 20. Rolling bearing
11, 21. Inner race
12, 22. Outer race
30. Housing
31. Inner peripheral portion
40. Shaft member
41. Outer peripheral portion
42a, 42b. End portion
50. Bearing restricting means
51a, 51b. Ring groove
52a, 52b. Snap ring
53a, 53b. Lid
54a, 54b. Shoulder
55. Preload sourced
60, 70, 300, 400. Magnetic angle sensor
61, 71. Magnet
62, 72. Magnetic sensor element
301. Primary scale magnet
302. Vernier magnet
303, 304, 401, 402. Magnetic sensor element
401. Cylindrical magnet

What is claimed is:
1. A torque sensor unit comprising:
a first rolling bearing including a first inner race and a first outer race;
a second rolling bearing including a second inner race and a second outer race;
a housing having an inner peripheral portion to which the first outer race and the second outer race are fitted;
a shaft member having an outer peripheral portion to which the first inner race and the second inner race are fixed such that the first inner race and the second inner race rotate together with the shaft member, and two end portions exposed to outside in an axial direction;

a bearing restricting assembly restricting axial positions of the first rolling bearing and the second rolling bearing;
a first magnetic angle sensor fixed to the first rolling bearing and configured to convert an absolute rotation angle of the first inner race when the shaft member is twisted to a first output signal; and
a second magnetic angle sensor fixed to the second rolling bearing and configured to convert an absolute rotation angle of the second inner race when the shaft member is twisted to a second output signal.

2. The torque sensor unit of claim 1, wherein the first magnetic angle sensor is located on a side of the first rolling bearing facing the second rolling bearing, and
the second magnetic angle sensor is located on a side of the second rolling bearing facing the first rolling bearing.

3. The torque sensor unit of claim 1, wherein the bearing restricting assembly is configured to generate a preload for eliminating gaps in the first rolling bearing and the second rolling bearing.

4. The torque sensor unit of claim 1, wherein each of the first magnetic angle sensor and the second magnetic angle sensor includes a primary scale magnet including a plurality of pairs of circumferentially arranged magnetic poles, a Vernier magnet arranged so as to be concentric with the primary scale magnet and including a plurality of pairs of magnetic poles, wherein the total number of pairs of magnetic poles of the primary scale magnet is different than the total number of pairs of magnetic poles of the Vernier magnet, a first magnetic sensor element for detecting a density of a magnetic flux generated by the primary scale magnet, and a second magnetic sensor element for detecting a density of a magnetic flux generated by the Vernier magnet.

5. The torque sensor unit of claim 1, wherein each of the first magnetic angle sensor and the second magnetic angle sensor includes a cylindrical magnet magnetized in a diametrical direction of the cylindrical magnet, a first magnetic sensor element for detecting a tangential component of a magnetic field generated by the cylindrical magnet, and a second magnetic sensor element for detecting a radial component of said magnetic field.

6. The torque sensor unit of claim 2, wherein the bearing restricting assembly is configured to generate a preload for eliminating gaps in the first rolling bearing and the second rolling bearing.

7. The torque sensor unit of claim 2, wherein each of the first magnetic angle sensor and the second magnetic angle sensor includes a primary scale magnet including a plurality of pairs of circumferentially arranged magnetic poles, a Vernier magnet arranged so as to be concentric with the primary scale magnet and including a plurality of pairs of magnetic poles, wherein the total number of pairs of magnetic poles of the primary scale magnet is different than the total number of pairs of magnetic poles of the Vernier magnet, a first magnetic sensor element for detecting a density of a magnetic flux generated by the primary scale magnet, and a second magnetic sensor element for detecting a density of a magnetic flux generated by the Vernier magnet.

8. The torque sensor unit of claim 3, wherein each of the first magnetic angle sensor and the second magnetic angle sensor includes a primary scale magnet including a plurality of pairs of circumferentially arranged magnetic poles, a Vernier magnet arranged so as to be concentric with the primary scale magnet and including a plurality of pairs of magnetic poles, wherein the total number of pairs of magnetic poles of the primary scale magnet is different than the total number of pairs of magnetic poles of the Vernier magnet, a first magnetic sensor element for detecting a density of a magnetic flux generated by the primary scale magnet, and a second magnetic sensor element for detecting a density of a magnetic flux generated by the Vernier magnet.

9. The torque sensor unit of claim 6, wherein each of the first magnetic angle sensor and the second magnetic angle sensor includes a primary scale magnet including a plurality of pairs of circumferentially arranged magnetic poles, a Vernier magnet arranged so as to be concentric with the primary scale magnet and including a plurality of pairs of magnetic poles, wherein the total number of pairs of magnetic poles of the primary scale magnet is different than the total number of pairs of magnetic poles of the Vernier magnet, a first magnetic sensor element for detecting a density of a magnetic flux generated by the primary scale magnet, and a second magnetic sensor element for detecting a density of a magnetic flux generated by the Vernier magnet.

10. The torque sensor unit of claim 2, wherein each of the first magnetic angle sensor and the second magnetic angle sensor includes a cylindrical magnet magnetized in a diametrical direction of the cylindrical magnet, a first magnetic sensor element for detecting a tangential component of a magnetic field generated by the cylindrical magnet, and a second magnetic sensor element for detecting a radial component of said magnetic field.

11. The torque sensor unit of claim 3, wherein each of the first magnetic angle sensor and the second magnetic angle sensor includes a cylindrical magnet magnetized in a diametrical direction of the cylindrical magnet, a first magnetic sensor element for detecting a tangential component of a magnetic field generated by the cylindrical magnet, and a second magnetic sensor element for detecting a radial component of said magnetic field.

12. The torque sensor unit of claim 6, wherein each of the first magnetic angle sensor and the second magnetic angle sensor includes a cylindrical magnet magnetized in a diametrical direction of the cylindrical magnet, a first magnetic sensor element for detecting a tangential component of a magnetic field generated by the cylindrical magnet, and a second magnetic sensor element for detecting a radial component of said magnetic field.

13. The torque sensor unit of claim 1, wherein the bearing restricting assembly comprises a lid.

14. The torque sensor unit of claim 13, wherein the bearing restricting assembly further comprises a bolt.

15. The torque sensor unit of claim 1, further comprising ring grooves defined in the shaft member, and snap rings fitted in the ring grooves, respectively.

16. The torque sensor unit of claim 3, wherein the bearing restricting assembly is configured to generate the preload with an elastically compressible member.

17. The torque sensor unit of claim 16, wherein the bearing restricting assembly comprises a lid adjacent to one of the first rolling bearing and the second rolling bearing and the elastically compressible member is between the lid and the one of the first rolling bearing and the second rolling bearing.

18. The torque sensor unit of claim 16, wherein the elastically compressible member applies an axial pushing force to one of the first outer race and the second outer race.

19. The torque sensor unit of claim 1, wherein the housing surrounds the first rolling bearing and the second rolling bearing.

20. The torque sensor unit of claim 1, wherein the housing comprises shoulders fitted to the first rolling bearing and the second rolling bearing, respectively.

* * * * *